(12) United States Patent
Srikant

(10) Patent No.: US 6,640,038 B2
(45) Date of Patent: Oct. 28, 2003

(54) DISPERSION MANAGED FIBERS HAVING REDUCED SENSITIVITY TO MANUFACTURING VARIABILITIES

(75) Inventor: V. Srikant, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 190 days.

(21) Appl. No.: 09/853,070

(22) Filed: May 9, 2001

(65) Prior Publication Data

US 2002/0003938 A1 Jan. 10, 2002

Related U.S. Application Data

(60) Provisional application No. 60/208,256, filed on May 31, 2000.

(51) Int. Cl.$^7$ ............................. G02B 6/18; G02B 6/22

(52) U.S. Cl. ........................... 385/127; 385/124

(58) Field of Search ......................... 385/123–128

(56) References Cited

U.S. PATENT DOCUMENTS

| | | | |
|---|---|---|---|
| 5,361,319 A | 11/1994 | Antos et al. | 385/123 |
| 5,613,028 A | 3/1997 | Antos et al. | 385/123 |
| 5,778,128 A | 7/1998 | Wildeman | 385/123 |
| 5,887,105 A | 3/1999 | Bhagavatula et al. | 385/123 |
| 5,894,537 A | 4/1999 | Berkey et al. | 385/123 |
| 5,999,679 A | 12/1999 | Antos et al. | 385/127 |
| 6,044,191 A | 3/2000 | Berkey et al. | 385/123 |
| 6,173,588 B1 | 1/2001 | Berkey et al. | 65/407 |
| 6,317,552 B1 | 11/2001 | Berkey | |
| 6,421,490 B1 | 7/2002 | Liu | 385/127 |
| 6,434,975 B2 | 8/2002 | Berkey | 65/403 |
| 2002/0028051 A1 | 3/2002 | Bickham et al. | 385/123 |
| 2003/0021561 A1 | 1/2003 | Berkey et al. | 385/123 |

FOREIGN PATENT DOCUMENTS

| | | | |
|---|---|---|---|
| EP | 0721119 | 7/1996 | G02B/6/22 |
| WO | WO 97/33188 | * 9/1997 | |
| WO | WO 97/41076 | 11/1997 | C03B/37/018 |
| WO | WO 99/42869 | 8/1999 | G02B/6/16 |
| WO | WO 00/17680 | 3/2000 | G02B/6/16 |
| WO | WO 00/67053 | 11/2000 | G02B/6/16 |

OTHER PUBLICATIONS

K. Petermann, "Constraints for Fundamental–Mode Spot Size for Broadband Dispersion–Compensated Single–Mode Fibres", Electronics Letters, vol. 19, No. 18, Sep. 1, 1983, pp. 712–714.

C. Pask, "Physical Interpretation of Petermann's Strange Spot Size for Single–Mode Fibres", Electronics Letters, vol. 20, No. 3, Feb. 2, 1984, pp. 144–145.

(List continued on next page.)

Primary Examiner—Hemang Sanghavi
Assistant Examiner—Omar Rojas
(74) Attorney, Agent, or Firm—Randall S. Wayland; William J. Chervenak

(57) ABSTRACT

Dispersion managed fibers which preferably have a central core region, a moat region, and a ring region are provided. The central core region preferably has an alpha profile with an alpha value preferably less than about 2.3. The moat region preferably includes four sub-regions, namely, a first sub-region (11) in which the index of refraction decreases, a second sub-region (12) in which the index of refraction increases substantially linearly, a fourth sub-region (14) in which the index of refraction again increases substantially linearly, and a third sub-region (13) which serves as a transition region which smoothly connects the third and fourth substantially linear sub-regions. The dispersion managed fibers preferably have the following properties: (a) they exhibit reduced sensitivity to manufacturing variabilities, (b) they have relatively small changes in mode field diameter at the junctions between fiber sections having positive dispersions and fiber sections having negative dispersions, and/or (c) they can be readily manufactured using the tablet method.

29 Claims, 6 Drawing Sheets

OTHER PUBLICATIONS

H. Anis, et al., "Continuous Dispersion Mananged Fiber for Very High Speed Soliton Systems", ECOC 1999.

L.F. Mollenauer et al., "Method for Facile and Accurate Measurement of Optical Fiber Dispersion Maps", Optics Letters, vol. 21, No. 21, Nov. 1, 1996, pp. 1724–1726.

Binh et al., "Generalized Approach to Single–Mode Dispersion–Modified Optical Fiber Design", Optical Engineering, Society of Photo–Optical Instrumentation Engineers, vol. 35, No. 8, Aug. 1, 1996, pp. 2250–2261.

* cited by examiner

DISPERSION MANAGED FIBERS HAVING REDUCED SENSITIVITY TO MANUFACTURING VARIABILITIES

This application claims the benefit of and priority to U.S. Provisional Patent Application No. 60/208,256, filed May 31, 2000.

FIELD OF THE INVENTION

This invention relates to dispersion managed fibers and, in particular, to dispersion managed fibers which exhibit reduced sensitivity to manufacturing variabilities, have relatively small changes in mode field diameter (MFD) at the junctions between fiber sections having positive dispersions and fiber sections having negative dispersions, and/or are readily manufactured using the "tablet" method.

BACKGROUND OF THE INVENTION

A. Dispersion Managed Fibers

Dispersion managed fibers are optical fibers which have a low to zero net dispersion by purposely incorporating, along the axial length of the fiber, sections that have a positive dispersion and sections that have a negative dispersion.

The discovery of dispersion managed fibers arose, at least in part, from the realization that transmission of light at high bit rates (>40 Gbs) requires not only handling linear impairment but also non-linear impairments. Initial work was done on understanding how dispersion management helped NRZ transmission. However, very soon it was realized that this concept applied equally well to other forms of data transmission (soliton, RZ, etc.).

Dispersion management has been proposed at various length scales, in the 100's of meters range and in the 10's of kilometers range, with names such as "dispersion managed fibers" used to refer to management in the 100's of meters range and "dispersion managed cable" referring to management on the 10's of kilometers range. For ease of discussion, the terminology "dispersion managed fiber" is used herein for both ranges.

In broadest outline, dispersion management achieves global near net zero dispersion while still having finite local dispersion. That is, by controlling the product of the length ($L_i$) and dispersion ($D_i$) of the individual fiber sections, the sum of those products for the entire fiber ($\Sigma L_i \cdot D_i$) can be made small, thus giving the fiber the desired low to zero net dispersion. As used herein, the sum of the $L_i \cdot D_i$ products for a dispersion managed fiber is referred to as the fiber's "overall" dispersion.

A key advantage of using fiber sections having substantial local dispersions (substantial $D_i$ values) is the avoidance of the adverse consequences of various non-linear effects, including four wave mixing. By avoiding these problems, higher power densities can be propagated in dispersion managed fibers than in conventional low dispersion fibers. This is an important advantage in terms of increasing the transmitted bit rate, the repeater spacing, and the total system length. It should be noted that these improvements in fiber performance are achieved irrespective of the transmission format, e.g., the improvements in performance are achieved for NRZ, RZ, and soliton transmission.

In addition to making the sum of the $L_i \cdot D_i$ products small, for fibers which are to carry signals at a plurality of wavelengths, i.e., WDM fibers, it is also important to control the change in dispersion with wavelength (dD/dλ) for the fiber (referred to hereinafter as the "dispersion slope" or "S"). More particularly, a dispersion managed fiber which is to be used in a WDM setting needs to have sections whose individual slopes ($S_i$) are controlled so that $\Sigma L_i \cdot S_i$ is close to or preferably equal to zero for the entire fiber.

The combination of the requirement that $\Sigma L_i \cdot D_i$ is approximately equal to zero and that $\Sigma L_i \cdot S_i$ is also approximately equal to zero, means that the ratio of $D_i$ to $S_i$ needs to be substantially the same for each section.

In addition to the foregoing, for very high bit rates, the variation in $D_i$ within a section (i.e., $D_i(l)$ where l is length along the fiber axis within a section) also becomes important. Specifically, if the variation in $D_i(l)$ is large, the non-linear effects which dispersion management is designed to address can still have an adverse effect on individual bits. That is, the system's "Q" value can be considerably reduced even though the average properties are well controlled over the whole system length.

A discussion of dispersion managed fibers, including the effects of local variations in dispersion, can be found in Anis et al., "Continuous Dispersion Managed Fiber For Very High Speed Soliton Systems," *ECOC'99 Proceedings*, Vol. 1, pages 230–232, 1999, and the references referred to therein, all of which are incorporated herein by reference.

B. The Problem of Process Variabilities in the Manufacture of Dispersion Managed Fibers Dispersion managed fibers can be manufactured in various ways known in the art. As with any manufacturing process, the processes used in making dispersion managed fibers result in at least some variations in the product due to process variabilities. As discussed above, the entire concept of dispersion management is based on tight control of both global and local dispersion, as well as dispersion slope. Accordingly, dealing with the problem of process variabilities is especially important in the area of dispersion managed fibers.

As described in detail below, in accordance with the invention, certain fiber profiles have been discovered which satisfy the optical properties needed for a dispersion managed fiber and which are significantly less sensitive to process variations. Such profiles allow for the manufacture of dispersion managed fibers with improved overall properties compared to those previously known in the art.

C. Fracture Problems Associated with the "Tablet" Method of Manufacturing Dispersion Managed Fibers A particularly efficacious approach to making dispersion managed fibers involves the use of individual "tablets" having the desired dispersion properties which are assembled together to form an entire fiber. A description of this process can be found in commonly assigned, co-pending, U.S. patent application Ser. No. 08/844,997, filed Apr. 23, 1997, and entitled "Method of Making Optical Fibers," the contents of which are incorporated herein by reference. This application was published as PCT Patent Publication No. WO97/41076 on Nov. 6, 1997.

The tablets used in this process tend to suffer from fracturing problems during manufacture. These tablets are formed from a core cane (i.e., a cane containing the core of the fiber and some cladding) by various cutting techniques, including scoring/snapping, laser cutting, water jet cutting, saw cutting, and the like. After cutting, the transverse surfaces of the tablet may be polished if desired.

In accordance with a further aspect of the invention, it has been discovered that the fracturing observed during the cutting of tablets is due to residual stresses introduced into the core cane by prior processing steps. Surprisingly, it has been found that the same types of profiles which reduce sensitivities to processing variabilities, also solve the fracturing problem.

It should be noted that the profiles of the invention which reduce sensitivities to processing variabilities can be used with manufacturing techniques which do not involve the cutting of tablets and thus do not have the fracturing problem.

SUMMARY OF THE INVENTION

In view of the foregoing, it is an object of the invention to provide fiber profiles for use in dispersion managed fibers which exhibit reduced sensitivities to manufacturing variabilities. More particularly, it is an object of the invention to provide dispersion managed fibers having a plurality of sections wherein the standard deviation of the dispersion values for the sections is reduced compared to prior dispersion managed fibers. It is also an object of the invention to provide sections whose dispersion values exhibit less variation along the length of a section.

It is another object of the invention to provide fiber profiles which lead to relatively small changes in mode field diameter (MFD) at the junctions between the positive and negative dispersion sections of a dispersion managed fiber. The problems associated with mode field diameter mismatches at such junctions are discussed below.

It is an additional object of the invention to provide profiles for core canes which are less subject to fracture when cut into tablets than prior art profiles.

To achieve these and other objects, the invention in accordance with a first aspect provides an optical waveguide fiber for use in a dispersion managed optical communication system comprising a core of transparent material surrounded by a cladding of transparent material having a refractive index $n_{cl}$, said core comprising three radially adjacent regions which in order of increasing radius are:

(a) a central core region having:
  (i) a maximum index of refraction $n_c$ such that $\Delta_c\%$ is greater than zero and less than about 1.2, where $\Delta_c\% = 100 \cdot (n_c^2 - n_{cl}^2)/2n_{cl}$; and
  (ii) an alpha profile with an alpha value less than about 2.3;

(b) a moat region having a minimum index of refraction $n_m$ such that $\Delta_m\%$ is less than or equal to $-0.3$, where $\Delta_m\% = 100 \cdot (n_m^2 - n_{cl}^2)/2n_{cl}$, said moat region comprising, in order of increasing radius, first, second, third, and fourth radially adjacent regions (also referred to herein as "sub-regions") wherein:
  (i) the index of refraction decreases throughout the first sub-region;
  (ii) the index of refraction increases substantially linearly in the second sub-region;
  (iii) the index of refraction increases substantially linearly in the fourth sub-region; and
  (iv) the third sub-region is a transition region which smoothly connects the third and fourth substantially linear sub-regions; and (c) a ring region having a maximum refractive index $n_r$ such that $\Delta_r\%$ is greater than zero and less than +0.5, where $\Delta_r\% = 100 \cdot (n_r^2 - n_{cl}^2)/2n_{cl}$.

As used herein, $c_{cl}$ is the minimum value of the index of refraction in the cladding of the fiber.

In accordance with a second aspect of the invention, $\Delta_m\%$ satisfies the following relationships:

$\Delta_m\% \leq -0.55$ for $R_c/R_m < 0.6$;
$\Delta_m\% \leq -0.50$ for $R_c/R_m < 0.45$;
$\Delta_m\% \leq -0.45$ for $R_c/R_m < 0.4$; or
$\Delta_m\% \leq -0.30$ for $R_c/R_m < 0.3$;

where $R_c$ is the outer radius of the central core region and $R_m$ is the outer radius of the moat region:

In accordance with a third aspect, the invention provides dispersion managed optical waveguide fibers composed of at least one section having a positive dispersion and at least one section having a negative dispersion, wherein the fiber and/or the sections have some and preferably all of the following properties:

(1) the overall dispersion of the fiber (i.e., the sum of the of the $L_i \cdot D_i$ products) is less than 1 ps/nm-km,
(2) the magnitude of the dispersion slope for each section of the fiber is less than 0.04 ps/nm²-km,
(3) the standard deviation of the dispersion values for fiber sections having negative dispersions is less than 0.5 ps/nm-km,
(4) the difference between the maximum and minimum values of the magnitude of the dispersion over the length of those sections of fiber which have a negative dispersion is less than 0.5 ps/nm-km,
(5) the standard deviation of the dispersion values for fiber sections having positive dispersions is less than 0.3 ps/nm-km,
(6) the difference between the maximum and minimum values of the magnitude of the dispersion over the length of those sections of the fiber having a positive dispersion is less than 0.3 ps/nm-km, and/or
(7) the average of the mode field diameters of the fiber sections having positive dispersions differs from the average of the mode field diameters of the sections having negative dispersions by less than 10 microns and preferably by less than 6 microns.

The standard deviations referred to in properties (3) and (5) are determined by obtaining dispersion values for fiber sections of a population of fibers, e.g., at least ten fibers, and then computing the standard deviation from the following formula, where the $x_i$'s are the dispersion values, $\bar{x}$ is the average of the dispersion values, and N is the total number of values:

$$S.D. = \sigma = \sqrt{\frac{1}{N} \sum_{i=1}^{N} (x_1 - \bar{x})^2}$$

This formula is used irrespective of the distribution of the data points, e.g., the formula is used even if the data is not normally distributed.

Dispersion values can be calculated from measured group delay in various ways known to the art. For example, interferometry techniques, details of which can be found in EIA/TIA-455-169A (FOTP-169) "Chromatic dispersion measurements of single mode optical fibers by phase shift method," or four wave mixing techniques as described in L. F. Mollenauer, P. V. Mamyshev and M. J. Neubelt, "Method for facile and accurate measurement of optical fiber dispersion maps," *Optics Letters*, Vol 21, No. 21, Nov. 15, 1996, can be used. Either technique can be used to calculate both positive and negative dispersions. The interferometry technique generally has better spatial resolution, while the four-wave mixing technique has better dispersion resolution.

In particular, by averaging over many measurements, the interferometry technique can be used to calculate dispersion values over fiber lengths less 100 m. On the other hand, using the four-wave mixing technique one can obtain dispersion values having a resolution less than 0.1 ps/nm-km for fiber lengths greater than 500 m. Hence, using a combination of these two techniques, one can reliably obtain dispersion values for fiber lengths less than 500 m.

Measurement of group delay at various wavelengths allows one to compute the dispersion by taking the derivative of the group delay measurement with respect to wavelength. Dispersion slope can then be obtained by taking the derivative of the computed dispersion with respect to wavelength. Usually, instead of taking derivatives of numerical values, fitting routines are used to fit the measured group delay and then the dispersion and the dispersion slope are calculated analytically by taking derivatives of the fit to the group delay data with respect to wavelength. The group delay data is preferably obtained using the measurement techniques described in the previous paragraph.

Mode field diameter is determined using Petermann's second definition of the mode field diameter in the near field. See K. Petermann, *Electronic Letters,* 1983, Vol. 19, pp. 712–714. The reference measurement method for mode-field diameter is the variable aperture method in the far field (VAMFF). Petermann's second definition of the mode-field diameter is a mathematical model which does not assume a specific shape for the distribution. This near field definition is related to the far field by the Hankel transform. Pask's transformation of Petermann's definition of the mode-field diameter is applied directly to the two-dimensional far field data through a numerical integration routine. See C. Pask, *Electronic Letters,* 1984, Vol 20, pp. 144–145. The Petermann mode-field diameter in the near field is calculated from the far field rms width.

The index of refraction profiles of fibers and/or fiber sections having the properties listed above are preferably those described above in accordance with the first and second aspects of the invention. However, other profiles can be used if desired. In general terms, the shape of the refractive index profile in any of the regions or sub-regions making up the overall profile may be selected from the group consisting of an α-profile, a step, a rounded step, a trapezoid, and a rounded trapezoid.

In accordance with a fourth aspect of the invention, a method of reducing the variation in dispersion of an optical waveguide fiber due to manufacturing variabilities is provided which comprises:

(a) selecting a profile for the fiber which comprises a central core region, a moat region, and a ring region, wherein the central core region has an alpha profile with an alpha value of less than about 2.3; and (b) manufacturing a fiber which substantially has the profile selected in step (a);

wherein the fiber manufactured in step (b) has:

(i) a dispersion slope whose magnitude is less than 0.04 ps/nm$^2$-km; and (ii) a dispersion the magnitude of which varies along the length of the fiber, the difference between the maximum and the minimum of said magnitude over said length being less than 0.5 ps/nm-km.

In accordance with a fifth aspect of the invention, a method of producing tablets from a silica core cane is provided which comprises:

(a) providing a silica core cane having a cladding which has an index of refraction $n_{cl}$, said silica core cane having an index of refraction profile which comprises a central core region, a moat region, and a ring region, wherein:

(i) both the central core region and the ring region are doped substantially only with germanium;

(ii) the moat region is doped substantially only with fluorine and has a minimum index of refraction $n_m$ such that $\Delta_m\%<0$ where $\Delta_m\%=100\cdot(n_m^2-n_{cl}^2)/2n_{cl}$; and (iii) the central core region has an alpha profile with an alpha value of less than about 2.3; and (b) cutting a plurality of tablets from the core cane.

Tablets made in this way exhibit less fracturing than tablets cut from a comparable core cane having a central core region whose alpha value is greater than 4.

In accordance with certain preferred embodiments of the invention, at least some of the fiber sections having positive dispersions have a profile $P^+(r)$, where r is radial distance from the center of the fiber, at least some of the fiber sections having negative dispersions have a profile $P^-(r')$, where r' is radial distance from the center of the fiber, $P^+$ and $P^-$ are substantially the same, and $r'=\xi r$, where $\xi$ is a constant which may be greater or less than 1.0. Put another way, in accordance with these embodiments, substantially the same profile shape is used for negative and positive dispersion sections, with the type of dispersion exhibited by a section being determined through adjustments in the scale of its profile, e.g., by adjustments in the over-clad diameter of the preform used to produce the section.

FIG. 1 illustrates particularly preferred refractive index profiles for the optical waveguide fibers and fiber sections of the invention. The reference numbers used in this figure correspond to the following:

10 central core region which is substantially centered about the symmetry line of the fiber;

11, 12, 13, 14 first, second, third, and fourth sub-regions of the moat region; and

15a, 15b, 15c representative examples of suitable, alternate profiles for the ring region.

Preferred values for the parameters $R_c$, $R_m$, $R_r$, $\Delta_c\%$, $\Delta_m\%$, and $\Delta_r\%$ are set forth in Table 1. Central core region 10 preferably has an alpha profile. As known in the art, an alpha profile can be defined by the equation:

$$\Delta(r)\%=\Delta(r_o)\%\cdot(1-[|r-r_o|/(r_1-r_o)]^\alpha),$$

where $r_o$ is the maximum point of the profile, $r_1$ is the point at which $\Delta(r)\%$ is zero, r is in the range $r_i \leq r \leq r_f$, $r_i$ is the initial point of the α-profile, $r_f$ is the final point of the α-profile, and α is an exponent which is a real number. In accordance with the preferred embodiments of the invention, α is less than about 2.3, and preferably is about 2.0. Most preferably, α is greater than about 1.5.

As shown in FIG. 1, the core consists of just the central core region, the moat region, and the ring region. As also shown in FIG. 1, the moat region consists of just the first, second, third, and fourth sub-regions. These configurations, whether used in combination as shown in FIG. 1 or used separately, represent preferred forms for the core and the moat region.

The refractive index profile shown in FIG. 1 is designed to provide a particular power distribution of signal light propagating in the waveguide fiber. It is this power distribution that results in the waveguide fiber having a desired dispersion and dispersion slope over a pre-selected range of wavelengths. At the same time, the power distribution of light signals propagating in the waveguide is controlled to provide such characteristics as single mode operation above a pre-selected wavelength (although various aspects of the invention are not limited to single mode waveguides), low attenuation (e.g., an attenuation no greater than about 0.34 dB/km at, for example, 1550 nm and preferably less than 0.25 dB/km), and a properly placed zero dispersion wavelength. A preferred pre-selected wavelength range is from about 1500 nm to about 1700 nm (most preferably from 1520 nm to 1650 nm) and a preferred zero dispersion wavelength is less than about 1400 nm, although the principles of the invention can be applied to other wavelength ranges and other zero dispersion wavelengths if desired.

Figure 3:
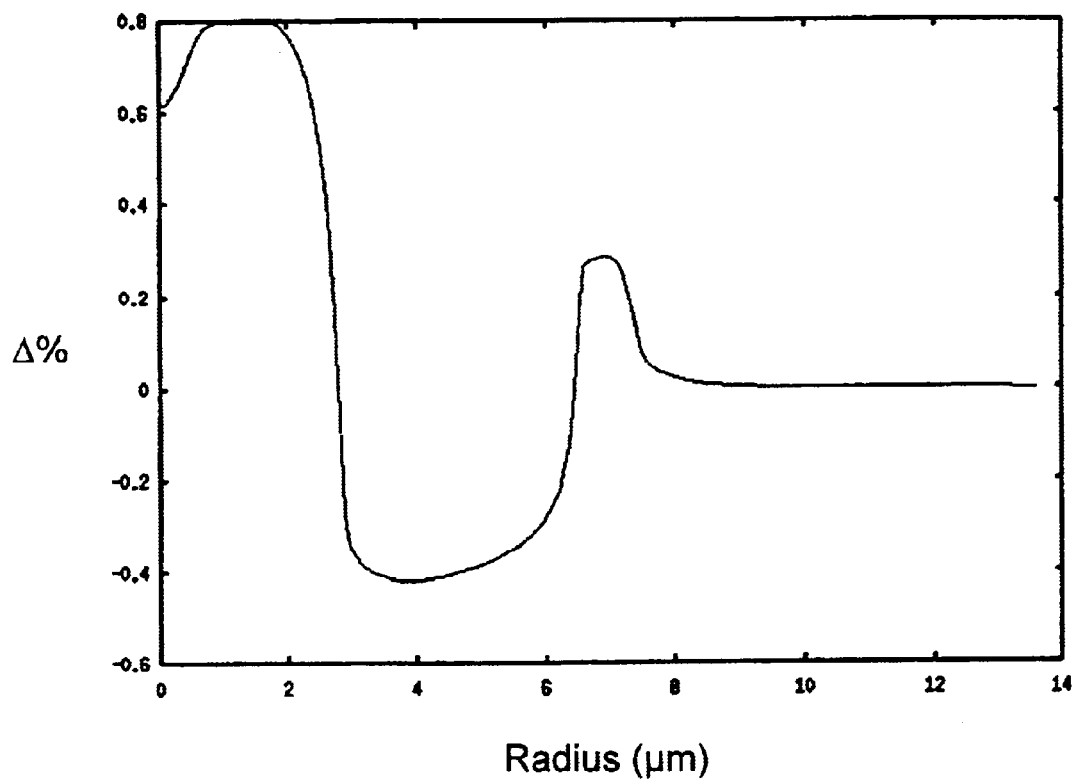
FIGS. 3 and 4 are schematic diagrams of the CP and IP profiles discussed below. The parameters for these profiles are set forth in Tables 2 and 4, respectively. The horizontal axis in these figures represents distance from the centerline of the fiber and the vertical axis represents index of refraction expressed as Δ% relative to the minimum value of the index of refraction in the cladding of the fiber.

Stretching of the profile of FIG. 3 while keeping the ratios between region radii and the deltas of the regions the same gives both positive dispersion/positive dispersion slope fibers and negative dispersion/negative dispersion slope fibers. The profile of FIG. 4 also has this property but in addition exhibits lower variation in dispersion characteristics with changes in the region radii and/or deltas of the profile.

Figure 4:
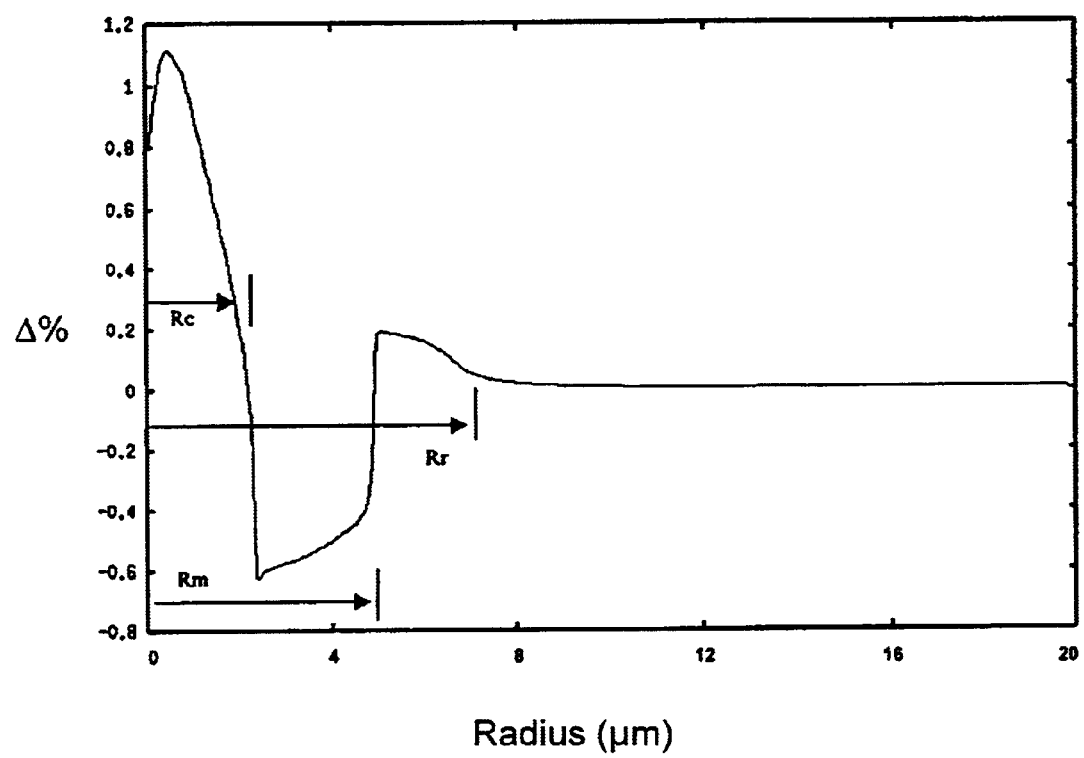
Figure 5:
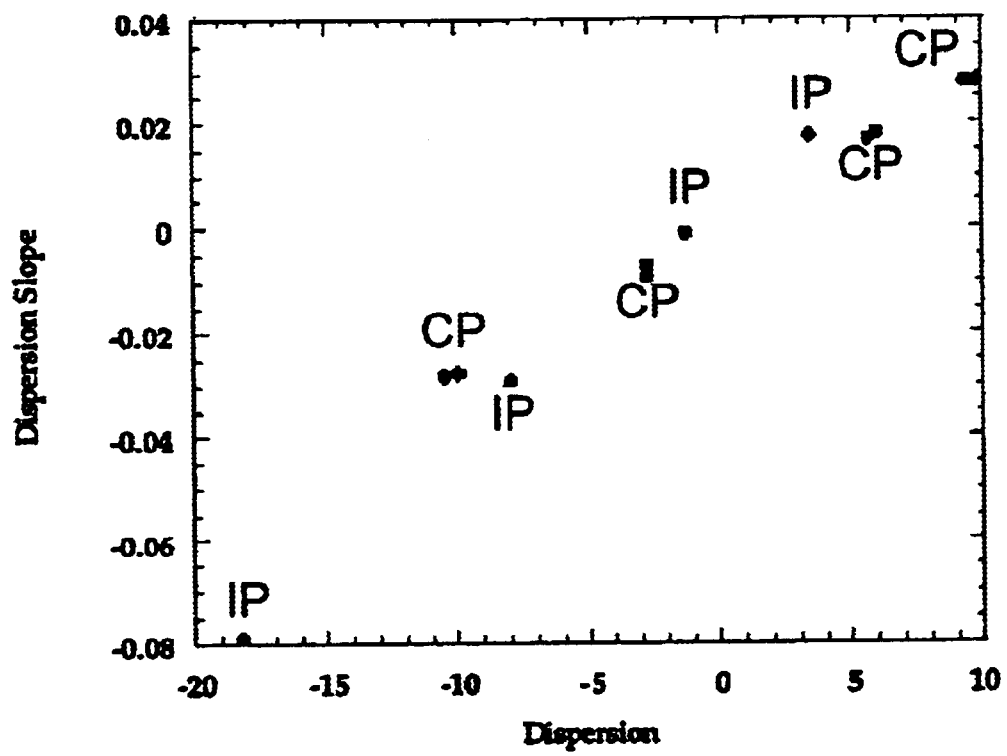

FIG. 5 is a plot of dispersion slope versus dispersion for fibers having either the profile of FIG. 3 (CP data points) or the profile of FIG. 4 (IP data points).

Figure 6:
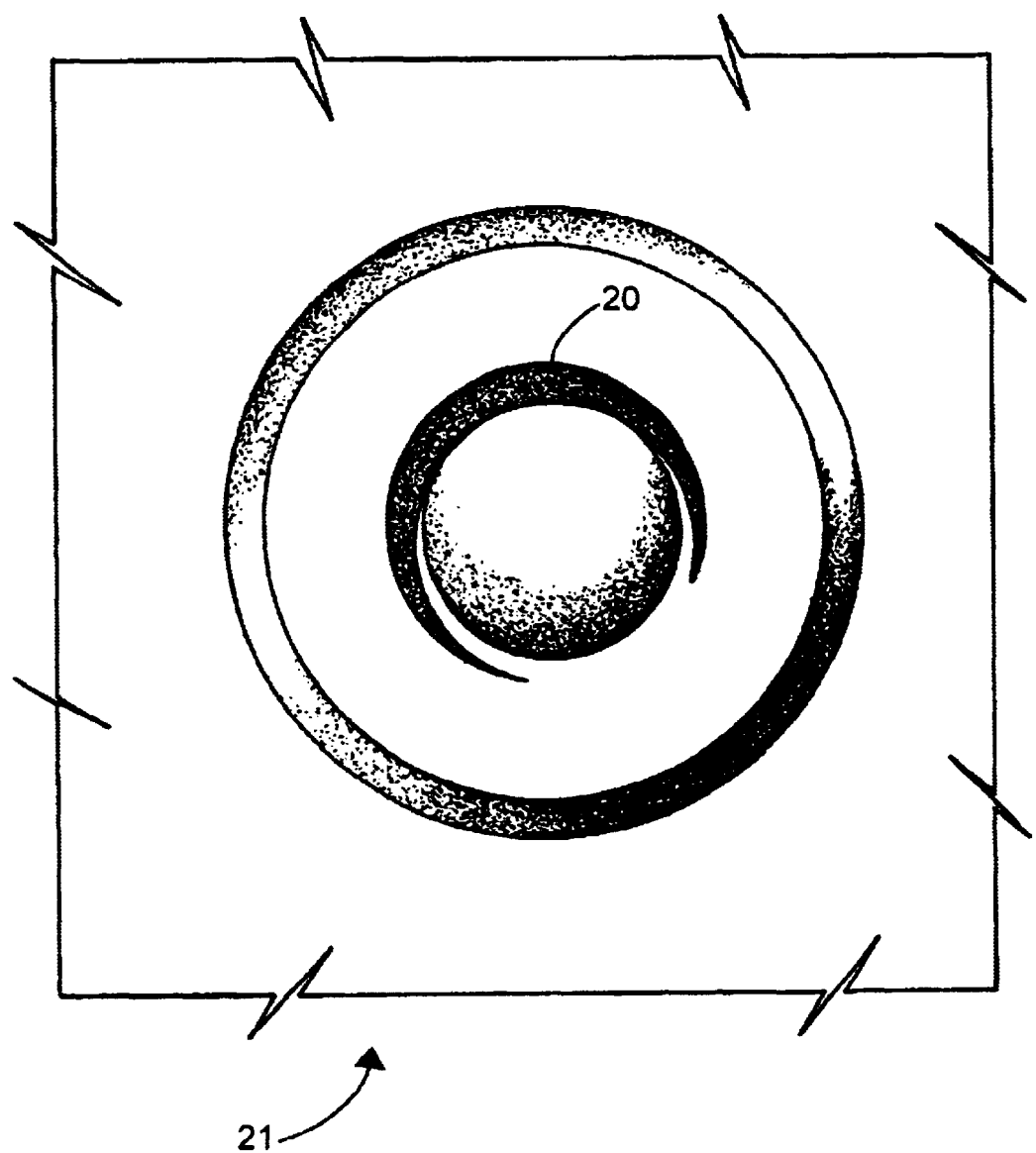

FIG. 6 illustrates cracking at the interface between a fluorine-doped moat region and a germania-doped central core region of a cane having the profile of FIG. 3. No such cracking is seen for canes having the profile of FIG. 4.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DETAILED DESCRIPTION OF THE INVENTION

Figure 2:
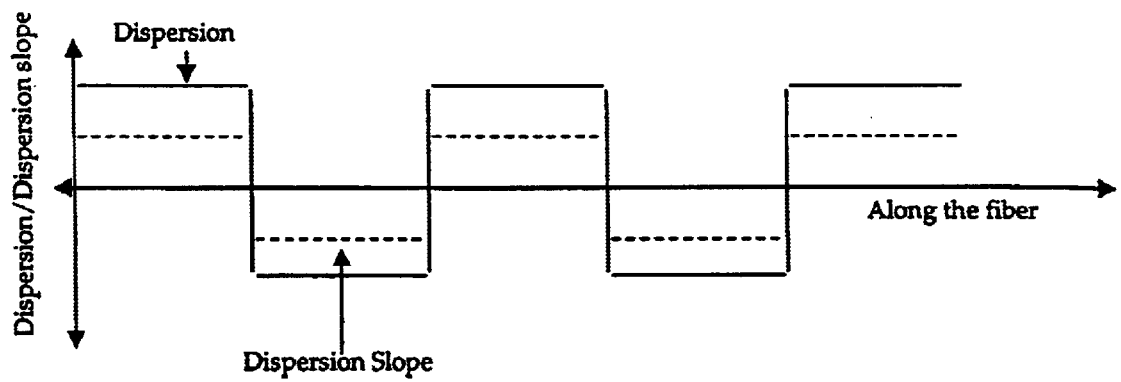
FIG. 2 is a schematic diagram illustrating a dispersion managed fiber wherein both the dispersion and the dispersion slope are managed on a section-by-section basis.

The initial work on dispersion management was aimed at creating alternating fiber sections that had positive and negative dispersions along the length of a fiber. More recent work has indicated that in the case of WDM systems, control of dispersion slope is also important. See Anis et al., supra, and FIG. 2.

In other words, it is critical not only to manage dispersion at one wavelength exactly but also to manage dispersion exactly at all the wavelengths at which light is to be transmitted. This realization leads, in turn, to a further requirement on the global properties of a dispersion managed fiber, namely, that the net global dispersion slope of the fiber is near zero.

There are two potential ways of achieving this requirement. One is to produce profiles that lead to finite dispersion (positive for the positive sections and negative for the negative sections) and near zero dispersion slope. The second method is to have the dispersion slope in the positive and negative sections be equal in magnitude and opposite in sign. The second method itself can have two renditions, one where the positive dispersion section has positive dispersion slope and the negative dispersion section has negative dispersion slope and the other where the positive dispersion section has negative slope and the negative dispersion section has positive slope. In practice, the first rendition is more easily achieved than the second rendition.

Initial attempts at making dispersion managed fibers with both dispersion and dispersion slope being managed simultaneously were geared towards anchoring one section to be a standard profile, for example a single mode fiber profile (e.g., the profile of Corning Incorporated's SMF-28 fiber), a profile for a non zero dispersion shifted fiber (NZDSF), etc., with the other section having dispersion characteristics that were equal in magnitude and opposite in sign to the first. Since all of these standard profiles have dispersion slope values that are positive and greater than +0.05 ps/nm$^2$-km, the profile of the other section had to have a negative dispersion slope of less than −0.05 ps/nm$^2$-km.

Profiles that have such levels of negative dispersion slope can be designed. However, such profiles tend to have small effective areas (nominally less than 40 $\mu^2$), the trend usually being smaller effective areas for negative dispersions and large negative dispersion slopes. In contrast, standard profiles tend to have large effective areas, e.g., greater than 55 $\mu^2$ and even greater than 80 $\mu^2$.

Such a mismatch in effective areas can be a problem. The problem is related to the mode field diameter (MFD) mismatch that can occur between two fiber sections having two different profiles. Mode field diameter is a measure of how the field of the fundamental mode is distributed in the core/cladding of the fiber. Optical theory predicts that when the mode field diameter changes abruptly anywhere along the length of a fiber, light propagating from the larger mode field diameter section to the smaller mode field diameter section experiences a back reflection, which in turn leads to excess loss and also potentially to interference between the forward propagating pulse and the $2^{nd}$ and $4^{th}$ order reflections.

Accordingly, it is important to keep the mismatch small between the mode field diameters of adjacent sections of a dispersion managed fibers so as to minimize losses. This can be achieved in two ways. One way is to make sure that the mode field diameters of the two sections are very similar and the other is to use an adiabatic tapper either during processing or during the physical joining of the two fibers (also referred to as splicing). In accordance with the invention, this problem is addressed by making the two sections have similar effective areas while still having the desired dispersive properties. Since, as discussed above, the effective area of a section having a negative dispersion slope is small, the only way to reduce the effective area mismatch is to reduce the effective area of the section with a positive dispersion slope. However, it is important to note that having the largest possible effective area presents many advantages, including advantages in overcoming non-linear effects.

In accordance with the invention, it has been determined that the best compromise is to maximize the effective area of the section having a negative dispersion slope while simultaneously achieving an effective area in the section having the positive dispersion slope that is close enough to that of the negative section so as to avoid mode field diameter mismatch problems. A preferred way to achieve this compromise solution is to design profiles for the two sections such that the sections have dispersion slopes that are very close to zero or have slopes that are slightly positive and slightly negative. One such solution, discussed in further detail below, is to design a profile that accesses both of the required regimes of dispersive properties (e.g., positive dispersion and low positive or negative slope and negative dispersion and low positive or negative slope, or positive and negative dispersion with near zero slope).

Taking into account the various optical property requirements, profiles have been designed in accordance with the invention that achieve positive and negative dispersions in combination with low positive and negative dispersion slopes (and even zero slope) and which have substantially matching effective areas in the two sections. One such profile (referred to herein as the Controlled $D_i/S_i/MFD_i$ Profile or simply the "CP" profile) is shown in FIG. 3. Various aspects of the profile, i.e., deltas, widths, and central core alpha ($\alpha_c$), are given in Table 2.

An important aspect of the CP profile of FIG. 3 is that by changing the core radius it is possible to achieve positive dispersion and dispersion slope values and negative dispersion and dispersion slope values. This can be seen in Table 3 where dispersion and dispersion slope values have been determined for fibers made with the profile of FIG. 3 having different over-clad diameters thus leading to different core/clad ratios for a constant fiber diameter.

Although the profile of FIG. 3 addresses the optical requirements for a dispersion managed fiber, it does not include a further important aspect of the invention, namely, insensitivity of the profile to process variability. As discussed in Anis et al., supra, in addition to controlling dispersion between sections of fiber having designed dispersive properties, it is also extremely important to control dispersion variation along the length of individual fiber sections. Indeed, Anis et al. state that "the main limitation to greater error-free distances is the local dispersion variations in the fibers that make up the spans."

Unlike gross residual dispersion at the end of a span or a link which can be managed effectively by adding required lengths of dispersion compensating fiber, dispersion variations that occur locally due to process variabilities are random and cannot be managed effectively at the end of a span or a link. Hence the only method for reducing the effects of local variations of dispersion is to not have such variations in the first place.

There are two ways to reduce the local variability in dispersion. One is to have better control of the manufacturing processes and the other is to design profiles that are less sensitive to manufacturing process variabilities. The present invention is addressed to this latter approach, i.e., the present invention is addressed to providing profiles for the positive and negative sections of dispersion managed fibers that have reduced sensitivity to process variability. The design rules that produce such profiles were developed as follows.

The dispersive properties of a profile can basically be divided into two parts: one part arising from material dispersion and the other arising from waveguide dispersion. Material dispersion is dependent solely on the materials used in the fabrication of the fiber and as a substantial part of any optical fiber is made of pure silica, the material dispersive properties are for the most part dominated by the dispersive properties of silica and are difficult to manipulate.

On the other hand, waveguide dispersion can be manipulated extensively through profile design. In fact, it was through the use of waveguide dispersion that dispersion shifted fibers were first manufactured. Variabilities in manufacturing for the most part only affect waveguide dispersion. Their effect on material dispersion is small and for all practical purposes can be neglected. Accordingly, reduced sensitivity to process variability can be achieved through proper control of waveguide dispersion.

With the foregoing in mind, we now turn to discussions of (1) the profile features that are needed to achieve low positive and negative dispersion slope, and (2) the profile features that lead to decreased sensitivity to process variability. We then discuss the design of a profile that has both the desired optical properties and the desired reduced sensitivity to process variability.

Four different features of a segmented core profile of the type shown in FIG. 3 can be used to achieve low positive and negative dispersion slopes. These are:

(1) Making the transition between the central core region and the moat region sharp. In mathematical terms, this implies having a large value for alpha for the central core region.

(2) Increasing the depth of the moat region to as low a value as possible.

(3) Decreasing the core/moat ratio, i.e., decreasing the size of the core region with respect to the moat region (4) Having the peak of the ring region displaced a small distance away from the point where the moat region ends.

Of the above four techniques, the first three have a stronger effect on the dispersion slope value than the fourth.

On the other hand, the profile that has the least sensitivity to process variability is the one which has very gradual transitions between the various regions of the profile. The more gradual the transition, the better it is from a resistance to process variability standpoint. It is also to be noted that this gradual transition is more important where the intensity of the signal traveling in the fiber is high. This implies that it is more important to manage the transition between the central core region and the moat region than it is to manage the transition between the moat region and the ring region which in turn is more important to manage than the transition between the ring region and subsequent regions beyond it. In mathematical terms, this translates to minimizing the following function $$\int \frac{dn(r)}{dr} I(r) r dr$$

where n(r) is the index of refraction profile, I(r) is the light intensity profile, and r is radial distance from the center of the fiber.

Comparing the requirements for a profile having reduced sensitivity to process variability with the requirements for a profile which achieves low positive to low negative dispersion slopes, we see that one factor is at odds. That is the transition between the central core region and the moat region where to achieve low dispersion slope values requires a sharp transition while to achieve reduced sensitivity requires a gradual transition.

However, there is more than one way to achieve low positive and negative dispersion slopes. By use of these other approaches, the invention achieves not only the desired dispersion slope values but also the desired reduced sensitivity to process variability.

FIG. 4 shows a profile (referred to herein as the "Insensitive to Process Variability Profile" or simply the "IP" profile) designed to achieve these twin goals of desired dispersion properties and reduced sensitivity to process variability. Various aspects of the profile, i.e., deltas, widths, and central core alpha ($\alpha_c$), are given in Table 4. Fibers having profiles of the type shown in FIG. 4 can achieve dispersion values that range from +12 to −30 ps/nm-km and dispersion slope values that are less than 0.03 ps/nm$^2$-km.

In FIG. 5, the dispersion and dispersion slope characteristics of a fiber manufactured from this profile is compared with those of a fiber that was manufactured using the profile shown in FIG. 3. As can be seen from this figure, the two profiles exhibit similar dispersion and dispersion slope characteristics.

Significantly, however, an analysis of the sensitivity of the two profiles to process variations showed that the profile of FIG. 4 is far superior to that of FIG. 3. The details of the comparison are set forth in Table 5. The data in this table was obtained using numerical simulations to solve for the dispersion and dispersion slopes of the two profiles. Changes in dispersion were then computed as the different aspects of the profiles were changed individually (central core delta and width, moat delta and width, and ring delta and width). Using perturbation theory, it can be shown that for small variations in the various deltas and widths of a refractive index profile, the variation in the dispersion of a waveguide due to each of them separately are mutually independent and hence can be added in quadrature. The values set forth in Table 5 for the total change in dispersion expected for a given set of variations in the various widths and deltas were obtained in this way.

As can be seen from Table 5, the IP profile of FIG. 4 is nearly 4 times less sensitive than the CP profile of FIG. 3. This analysis indicates that for any random variation that a fiber may encounter, e.g., a variation due to processing or post processing perturbations like jacketing, a fiber manufactured using the profile in FIG. 4 will be less sensitive than a fiber manufactured using the profile of FIG. 3.

An additional feature of the profile in FIG. 4 is that it is highly resistant to fracture during the dicing/sawing of glass rods (core canes) used to make individual sections of a dispersion managed fiber. The reason for this improved behavior of the IP profile compared to the CP profile lies in the fact that the concentration profiles of the dopants in the various regions of the core of the IP profile are more graded than those of the CP profile. Analysis of cracked canes indicated that the cracking was due to thermal residual stress induced in the cane during the redraw stage. Such residual stresses become particularly sever because of the vastly different thermal properties of germania and fluorine doped silica.

The use of a graded concentration profile eliminates large stress gradients at the interfaces between different regions of a cane thus producing a cane that is more resistant to fracture. This is particularly important in the transition region between the germania doped central core region and the fluorine doped moat region. FIG. 6 shows a typical fractured surface 20 of a cane 21 having a profile of the type shown in FIG. 3 which lacks such a graded concentration profile between the central core region and the moat region.

Table 6 sets forth statistics for the CP and IP profiles of FIGS. 3 and 4 in terms of percentage of selects. Percentage of selects generally corresponds to the percentage of canes that survived the dicing and the slicing process without encountering cracks. As is quite evident from this table, the canes manufactured using the IP profile of FIG. 4 are significantly more robust to fracturing than the canes that were manufactured with the CP profile of FIG. 3. In comparing FIGS. 3 and 4, it should be noted that Δ% drops from about 0.6 to −0.3 in less than about 0.2 microns in FIG. 3, i.e., the slope of the profile of FIG. 3 is approximately 4.5. The slope of the profile of FIG. 4, on the other hand, is substantially smaller in the central core to moat transition region.

The dispersion managed fibers and fiber sections of the invention can be produced using various materials and methods known in the art. For example, the methods described in the above-reference U.S. patent application Ser. No. 08/844,997 can be used in the practice of the invention. Other methods are described in co-pending and commonly-assigned U.S. patent application Ser. No. 09/239,509, filed Jan. 28, 1999 and entitled "Low Slope Dispersion Managed Waveguide". Methods other than those disclosed in these applications can, of course, be used in the practice of the present invention.

Although preferred and other embodiments of the invention have been described herein, further embodiments may be perceived by those skilled in the art without departing from the scope of the invention as defined by the following claims.

TABLE I

Figure 1:
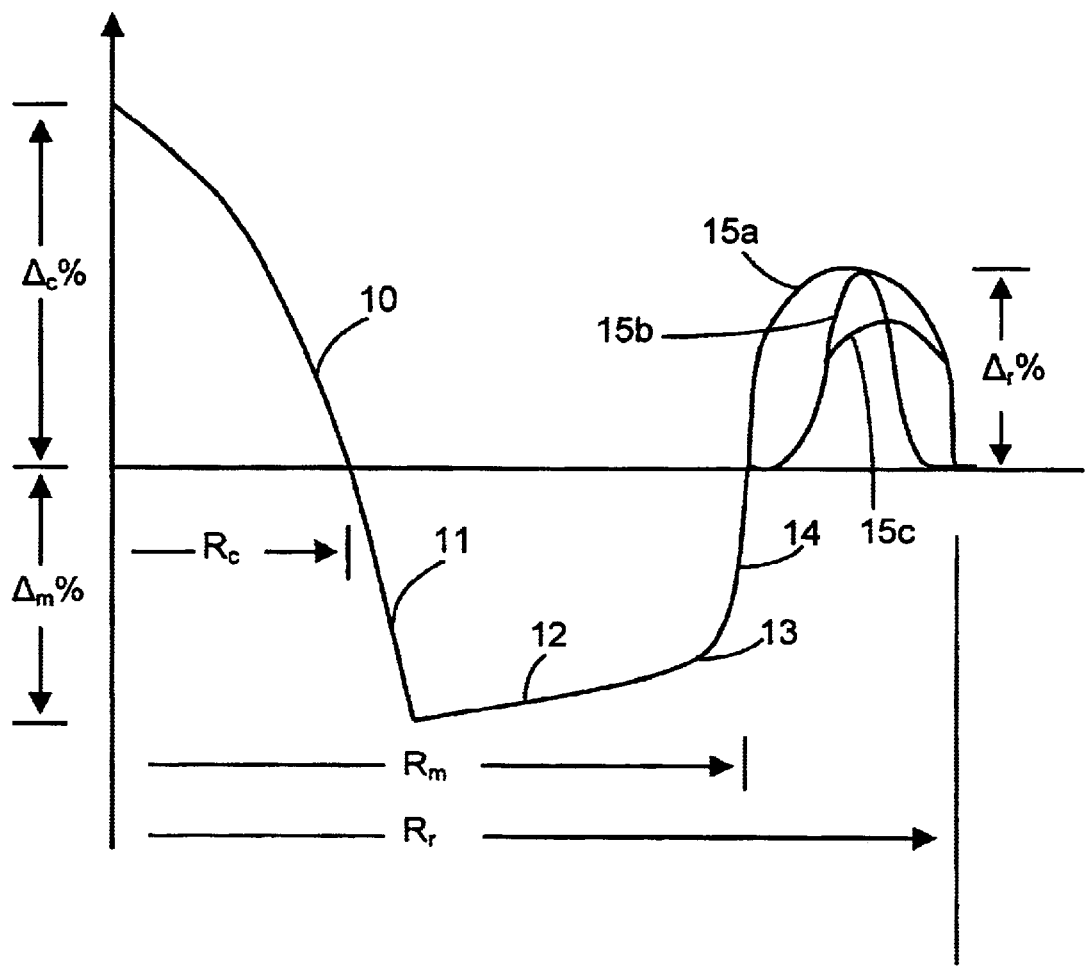
FIG. 1 is a schematic diagram of an index of refraction profile for an optical waveguide fiber or fiber section designed in accordance with the invention.

Parameter Ranges for the Profile of FIG. 1

| Parameter | Range |
|---|---|
| $R_c$ | 1 μm < $R_c$ < 4 μm |
| $R_m$ | 2 μm < $R_m$ < 12 μm |
| $R_r$ | 3 μm < $R_r$ < 20 μm |
| $\Delta_c\%$ | 0.5 < $\Delta_c\%$ < 1.2 |
| $\Delta_m\%$ | −0.7 < $\Delta_m\%$ < −0.3 |
| $\Delta_r\%$ | 0.0 < $\Delta_r\%$ < 0.5 |

TABLE 2

Parameter Values for the CP Profile of FIG. 3

| Parameter | Value |
|---|---|
| $R_c$ | 2.16μ |
| $R_m$ | 6.30μ |
| $R_r$ | 7.50μ |
| $\Delta_c\%$ | 0.8 |
| $\Delta_m\%$ | −0.41 |
| $\Delta_r\%$ | 0.25 |
| $\alpha_c$ | 8 |

TABLE 3

Dispersion Characteristics Versus Over Clad Diameter for CP Profile

| Over Clad Diameter (mm) | Dispersion (ps/nm-km) | Dispersion Slope (ps/nm$^2$-km) |
|---|---|---|
| 44.36 | 3.4000 | 0.017650 |
| 46.1 | −1.3000 | −0.00074000 |
| 47.94 | −7.9600 | −0.029000 |
| 50 | −18.220 | −0.079000 |

TABLE 4

Parameter Values for the IP Profile of FIG. 4

| Parameter | Value |
|---|---|
| $R_c$ | 2.50μ |
| $R_m$ | 6.25μ |
| $R_r$ | 9.40μ |

TABLE 4-continued

Parameter Values for the IP Profile of FIG. 4

| Parameter | Value |
|---|---|
| $\Delta_c\%$ | 1.1 |
| $\Delta_m\%$ | −0.53 |
| $\Delta_r\%$ | 0.23 |
| $\alpha_c$ | 2 |

TABLE 5

Comparison of Sensitivity of CP and IP profiles

| | | Dispersion Variation | |
|---|---|---|---|
| Range | Parameter | CP Profile | IP Profile |
| +/−0.001 | Central core delta | 23 | 4.1 |
| +/−0.001 | Moat delta | 4.3 | 1.89 |
| +/−0.001 | Ring delta | 3.5 | 0.5 |
| +/−0.1 | Central core width | 14.3 | 5.25 |
| +/−0.1 | Moat width | 1.4 | 0.81 |
| +/−0.1 | Ring width | 1.2 | 0.5 |
| | Total | 27.7 | 7.01 |

TABLE 6

Percent Selects of Canes Made with the
CP and IP Profiles Diced Using Various Techniques

| | Cane Diameter | | |
|---|---|---|---|
| Design/Dicing Technique | 7 mm | 9 mm | 12 mm |
| CP Profile/ID Saw | 10% | 5% | 0% |
| CP Profile/Wire Saw | 82% | 70% | 0% |
| IP Profile/Wire Saw | 100% | — | 95% |

What is claimed is:

1. An optical waveguide fiber for use in a dispersion managed optical communication system comprising a core of transparent material surrounded by a cladding of transparent material having a refractive index $n_{cl}$, said core comprising three radially adjacent regions which in order of increasing radius are:
   (a) a central core region having:
      (i) a maximum index of refraction $n_c$ such that $\Delta_c\%$ is greater than zero and less than about 1.2, where $\Delta_c\%=100\cdot(n_c^2-n_{cl}^2)/2n_{cl}$; and
      (ii) an alpha profile with an alpha value less than about 2.3;
   (b) a moat region having a minimum index of refraction $n_m$ such that $\Delta_m\%$ is less than or equal to −0.3, where $\Delta_m\%=100\cdot(n_m^2-n_{cl}^2)/2n_{cl}$, said moat region comprising, in order of increasing radius, first, second, third, and fourth radially adjacent regions wherein:
      (i) the index of refraction decreases throughout the first region;
      (ii) the index of refraction increases substantially linearly in the second region;
      (iii) the index of refraction increases substantially linearly in the fourth region; and
      (iv) the third region is a transition region which smoothly connects the third and fourth substantially linear regions; and
   (c) a ring region having a maximum refractive index $n_r$ such that $\Delta_r\%$ is greater than zero and less than +0.5, where $\Delta_r\%=100\cdot(n_r^2-n_{cl}^2)/2n_{cl}$.

2. The optical waveguide fiber of claim 1 wherein the alpha value is greater than about 1.5.

3. The optical waveguide fiber of claim 1 wherein the moat region consists of the first, second, third and fourth regions.

4. The optical waveguide fiber of claim 1 wherein the slope of the second region is less than the slope of the fourth region.

5. The optical waveguide fiber of claim 1 wherein the fiber has a dispersion the magnitude of which varies along the length of the fiber and wherein the difference between the maximum and the minimum of said magnitude over said length is less than 0.5 ps/nm-km.

6. The optical waveguide fiber of claim 5 wherein the fiber has a net positive dispersion and the difference between the maximum and the minimum of said magnitude over said length is less than 0.3 ps/nm-km.

7. The optical waveguide fiber of claim 1 wherein the fiber has a net negative dispersion and a dispersion slope that is less than 0.04 ps/nm²-km.

8. An optical waveguide fiber for use in a dispersion managed optical communication system comprising a core of transparent material surrounded by a cladding of transparent material having a refractive index $n_{cl}$, said core comprising three radially adjacent regions which in order of increasing radius are:
   (a) a central core region having:
      (i) a maximum index of refraction $n_c$ such that $\Delta_c\%$ is greater than zero and less than about 1.2, where $\Delta_c\%=100\cdot(n_c^2-n_{cl}^2)/2n_{cl}$;
      (ii) an alpha profile with an alpha value less than about 2.3; and
      (iii) an outer radius $R_c$;
   (b) a moat region having an outer radius $R_m$ and a minimum index of refraction $n_m$ such that:
      $\Delta_m\% \leq -0.55$ for $R_c/R_m<0.6$;
      $\Delta_m\% \leq -0.50$ for $R_c/R_m<0.45$;
      $\Delta_m\% \leq -0.45$ for $R_c/R_m<0.4$; or
      $\Delta_m\% \leq -0.30$ for $R_c/R_m<0.3$;
      where $\Delta_m\%=100\cdot(n_m^2-n_{cl}^2)/2n_{cl}$, said moat region comprising, in order of increasing radius, first, second, third, and fourth radially adjacent regions wherein:
      (i) the index of refraction decreases throughout the first region;
      (ii) the index of refraction increases substantially linearly in the second region;
      (iii) the index of refraction increases substantially linearly in the fourth region; and
      (iv) the third region is a transition region which smoothly connects the third and fourth substantially linear regions; and
   (c) a ring region having a maximum refractive index $n_r$ such that $\Delta_r\%$ is greater than zero and less than +0.5, where $\Delta_r\%=100\cdot(n_r^2-n_{cl}^2)/2n_{cl}$.

9. The optical waveguide fiber of claim 8 wherein the alpha value is greater than about 1.5.

10. The optical waveguide fiber of claim 8 wherein the moat region consists of the first, second, third and fourth regions.

11. The optical waveguide fiber of claim 8 wherein the slope of the second region is less than the slope of the fourth region.

12. The optical waveguide fiber of claim 8 wherein the fiber has a dispersion the magnitude of which varies along the length of the fiber and wherein the difference between the maximum and the minimum of said magnitude over said length is less than 0.5 ps/mn-km.

13. The optical waveguide fiber of claim 12 wherein the fiber has a net positive dispersion and the difference between the maximum and the minimum of said magnitude over said length is less than 0.3 ps/nm-km.

14. The optical waveguide fiber of claim 8 wherein the fiber has a net negative dispersion and a dispersion slope that is less than 0.04 ps/nm²-km.

15. A population of dispersion managed optical waveguide fibers manufactured by a common set of process steps, said population comprising at least ten fibers, each fiber being a dispersion shifted fiber and comprising at least two sections, each section having a dispersion value $D_i$ and a dispersion slope value $S_i$, at least one of said $D_i$ being positive for each fiber and at least one other of said $D_i$ being negative for each fiber such that the overall dispersion of each fiber has a magnitude that is less than 1 ps/nm-km, wherein all of the $S_i$ values have a magnitude of less than 0.04 ps/nm²-km and the standard deviation of the dispersion values for the fiber sections having negative $D_i$'s is less than 0.5 ps/nm-km.

16. The population of claim 15 wherein the standard deviation of the dispersion values for the fiber sections having positive $D_i$'s is less than 0.3 ps/nm-km.

17. The population of claim 15 wherein the average of the mode field diameters of the fiber sections having positive $D_i$'s differs from the average of the mode field diameters of the fiber sections having negative $D_i$'s by less than 10 microns.

18. The population of claim 15 wherein the average of the mode field diameters of the fiber sections having positive $D_i$'s differs from the average of the mode field diameters of the fiber sections having negative $D_i$'s by less than 6 microns.

19. The population of claim 15 wherein:
(i) at least some of the sections having positive $D_i$'s have a profile $P^+(r)$, where r is radial distance from the center of the fiber;
(ii) at least some of the sections having negative $D_i$'s have a profile $P^-(r')$, where r' is radial distance from the center of the fiber; and
(iii) $P^+$ and $P^-$ are substantially the same and $r'=\xi r$, where $\xi$ is a constant.

20. The population of claim 19 wherein the average of the mode field diameters of the fiber sections having positive $D_i$'s differs from the average of the mode field diameters of the fiber sections having negative $D_i$'s by less than 10 microns.

21. The population of claim 19 wherein the average of the mode field diameters of the fiber sections having positive $D_i$'s differs from the average of the mode field diameters of the fiber sections having negative $D_i$'s by less than 6 microns.

22. A section of a dispersion managed optical waveguide fiber comprising a core and a cladding, said section connected between two sections having positive dispersion in a pre-selected wavelength range between 1500 and 1700 nm, said section having
a net negative dispersion in the pre-selected wavelength range, and
a dispersion slope that is less than 0.04 ps/nm²-km in the pre-selected wavelength range,
wherein the magnitude of said dispersion in the pre-selected wavelength range varies along the entire length of the section between the two sections having positive dispersion and the difference between the maximum and the minimum of said magnitude over said entire length of the section is less than 0.5 ps/nm-km in the pre-selected wavelength range.

23. A dispersion managed optical waveguide fiber of claim 22 comprising a plurality of sections having negative dispersion in the pre-selected wavelength range.

24. A section of a dispersion managed optical waveguide fiber comprising a core and a cladding, said section connected between two sections having negative dispersion in a pre-selected wavelength range between 1500 and 1700 nm, said section having a net positive dispersion in the pre-selected wavelength range and a dispersion slope that is less than 0.04 ps/nm²-km in the pre-selected wavelength range, wherein the magnitude of said dispersion in the pre-selected wavelength range varies along the entire length of the section and the difference between the maximum and the minimum of said magnitude over said entire length of the section is less than 0.3 ps/nm-km in the pre-selected wavelength range.

25. A dispersion managed optical waveguide fiber of claim 24 comprising a plurality of sections having negative dispersion in the pre-selected wavelength range.

26. A method of reducing the variation in dispersion of an optical waveguide fiber due to manufacturing variabilities comprising:
(a) selecting a profile for the fiber which comprises a central core region, a moat region, and a ring region, wherein the central core region has an alpha profile with an alpha value of less than about 2.3; and
(b) manufacturing a fiber which substantially has the profile selected in step (a);
wherein the fiber manufactured in step (b) has:
(i) a dispersion slope whose magnitude is less than 0.04 ps/nm²-km; and
(ii) a dispersion the magnitude of which varies along the length of
the fiber, the difference between the maximum and the minimum of said magnitude over said length being less than 0.5 ps/nm-km wherein the moat region comprises, in order of increasing radius, first, second, third, and fourth radially adjacent regions wherein:
(i) the index of refraction decreases throughout the first region;
(ii) the index of refraction increases substantially linearly in the second region;
(iii) the index of refraction increases substantially linearly in the fourth region; and
(iv) the third region is a transition region which smoothly connects the third and fourth substantially linear regions.

27. The method of claim 26 wherein the slope of the second region is less than the slope of the fourth region.

28. A method of reducing the variation in dispersion of an optical waveguide fiber due to manufacturing variabilities comprising:
(a) selecting a profile for the fiber which comprises a central core region, a moat region, and a ring region, wherein the central core region has an alpha profile with an alpha value of less than about 2.3; and
(b) manufacturing a fiber which substantially has the profile selected in step (a);
wherein the fiber manufactured in step (b) has:
(i) a dispersion slope whose magnitude is less than 0.04 ps/nm²-km; and
(ii) a dispersion the magnitude of which varies along the length of the fiber, the difference between the maximum and the minimum of said magnitude over said length being less than 0.5 ps/nm-km, wherein the fiber comprises a cladding having an index of refraction $n_{cl}$ and the moat region has a minimum index of refraction $n_m$ such that $\Delta_m\% \leq -0.3$, where $\Delta_m\% = 100 \cdot (n_m^2 - n_{cl}^2)/2n_{cl}$.

29. A method of reducing the variation in dispersion of an optical waveguide fiber due to manufacturing variabilities comprising:

(a) selecting a profile for the fiber which comprises a central core region, a moat region, and a ring region, wherein the central core region has an alpha profile with an alpha value of less than about 2.3; and (b) manufacturing a fiber which substantially has the profile selected in step (a);

wherein the fiber manufactured in step (b) has:

(i) a dispersion slope whose magnitude is less than 0.04 ps/nm²-km; and (ii) a dispersion the magnitude of which varies along the length of the fiber, the difference between the maximum and the minimum of said magnitude over said length being less than 0.5 ps/nm-km wherein the fiber comprises a cladding having an index of refraction $n_{cl}$ and the moat region has a minimum index of refraction $n_m$ such that $\Delta_m\%$ is less than zero, where $\Delta_m\% = 100 \cdot (n_m^2 - n_{cl}^2)/2n_{cl}$ and wherein the central core region has an outer radius $R_c$, the moat region has an outer radius $R_m$, and $\Delta_m\%$ and the ratio of $R_c$ to $R_m$ satisfy one of the following relationships:

$\Delta_m\% \leq -0.55$ for $R_c/R_m < 0.6$;
$\Delta_m\% \leq -0.50$ for $R_c/R_m < 0.45$;
$\Delta_m\% \leq -0.45$ for $R_c/R_m < 0.4$; or;
$\Delta_m\% \leq -0.30$ for $R_c/R_m < 0.3$.

* * * * *

UNITED STATES PATENT AND TRADEMARK OFFICE
CERTIFICATE OF CORRECTION

PATENT NO. : 6,640,038 B2
DATED : October 28, 2003
INVENTOR(S) : Srikant V

It is certified that error appears in the above-identified patent and that said Letters Patent is hereby corrected as shown below:

<u>Title page,</u>
Item [56], References Cited, OTHER PUBLICATIONS,
"H. Anis, et al., "Continuous Dispersion Mananged Fiber for" should be
-- H. Anis, et al., "Continuous Dispersion Managed Fiber for --

<u>Column 13,</u>
Line 55, "comprinsing, in order of increasing radius, first, second," should be
-- comprising, in order of increasing radius, first, second, --

<u>Column 14,</u>
Line 67, "length is less than 0.5 ps/mn-km." should be -- length is less than
0.5 ps/nm-km. --

Signed and Sealed this

Twenty-fourth Day of February, 2004

JON W. DUDAS
*Acting Director of the United States Patent and Trademark Office*